United States Patent
Tseng et al.

(10) Patent No.: US 7,309,142 B2
(45) Date of Patent: Dec. 18, 2007

(54) FLUORESCENT TUBES IN ORTHOGONAL ARRAY BACKLIGHT MODULE

(75) Inventors: Wen-Pao Tseng, Yangmei Taoyuan (TW); Hsin-Chien Chiang, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 70 days.

(21) Appl. No.: 10/984,764

(22) Filed: Nov. 10, 2004

(65) Prior Publication Data

US 2006/0098454 A1    May 11, 2006

(51) Int. Cl.
    *F21S 4/00*    (2006.01)
(52) U.S. Cl. ............ 362/227; 362/219; 362/249; 362/614; 362/633; 362/225
(58) Field of Classification Search .......... 362/227, 362/249, 219, 225, 614, 616, 632, 633, 634
See application file for complete search history.

(56) References Cited

U.S. PATENT DOCUMENTS

| | | | |
|---|---|---|---|
| 6,857,759 B2 * | 2/2005 | Lee et al. | 362/225 |
| 2005/0007783 A1 * | 1/2005 | Ono | 362/294 |
| 2005/0281023 A1 * | 12/2005 | Gould et al. | 362/217 |
| 2006/0023472 A1 * | 2/2006 | Liu et al. | 362/614 |

* cited by examiner

*Primary Examiner*—Sandra O'Shea
*Assistant Examiner*—Anabel Ton
(74) *Attorney, Agent, or Firm*—Troxell Law Office, PLLC

(57) ABSTRACT

An orthogonal array backlight module includes multiple fluorescent tubes paved on both inner sides of a light box, and a display panel comprised of diffuser plate, optical film and liquid crystal panel being provide on the top of the light box; and each fluorescent tube being significantly shorter than that of the prior art of same size to effectively provide consistent luminance and allow easier assembly.

2 Claims, 9 Drawing Sheets

FLUORESCENT TUBES IN ORTHOGONAL ARRAY BACKLIGHT MODULE

BACKGROUND OF THE INVENTION (a) Field of the Invention

The present invention is related to an orthogonal array backlight module lamp set, and more particularly, to one allows easier assembly and more consistent luminance by significantly shorter fluorescent tubes than those in any other backlight module of the same size.

(b) Description of the Prior Art

As illustrated in FIG. 1 of the accompanying drawings for an exploded view of an orthogonal array backlight module of the prior art applied in a LCD, multiple fluorescent tubes 20 are paved in a light box 10. A display panel 30 comprised of a diffuser plate 31, an optical film 32, and a liquid crystal panel 33 covers up an opening disposed on the top of the light box 10. Inner layer of the light box 10 is reflective to project lights from all the fluorescent tubes 20 towards the display panel 30. The display results of the entire backlight module are achieved by the lights projected from those fluorescent tubes 20 onto the display panel; and the frame for those fluorescent tubes of the prior art applied in an orthogonal array backlight module is essentially characterized by having all the fluorescent tubes 20 arranged in a single row and paved at a certain spacing on the inner layer of the light box 10 with each fluorescent tube in a length sufficient for all those fluorescent tubes to cover up the entire area of the display panel 30.

However, in case of a larger size of a display panel for the backlight module, both of the quantity and the length of the fluorescent 20 must be added to meet the requirements of the larger display panel. Increase of the quantity of the fluorescent tube alone will not adversely affect efficacy of the entire backlight module. However, when the further increase of the length of each individual fluorescent tube 20 is required, problems including difficulties both in the manufacturing and the assembly of the longer fluorescent tube emerge. The evenly emitted light relatively decreases, as the fluorescent tube gets longer; therefore the inconsistent performance of the luminance of those fluorescent tubes altogether serious affects the efficacy of the backlight module.

SUMMARY OF THE INVENTION

The primary purpose of the present invention is to provide an improved structure for those multiple fluorescent tubes in an orthogonal array backlight module that allows easy assembly and effectively eliminates the flaw of inconsistent luminance observed with the prior art when longer fluorescent tubes are installed. To achieve the purpose, shorter fluorescent tubes are used, and a saddle is provided at the center in the light box to define both wings. Each wing is arranged with multiple fluorescent tubes and one end of each tube is fixed to the saddle. The electrode of the tube is provided at the end of the tube fixed to the saddle for collecting the electrode circuits of all tubes in the backlight module on the middle section of the light box to facilitate the installation of the fluorescent tubes.

DETAILED DESCRIPTION OF THE PREFERRED EMBODIMENTS

Figure 1:
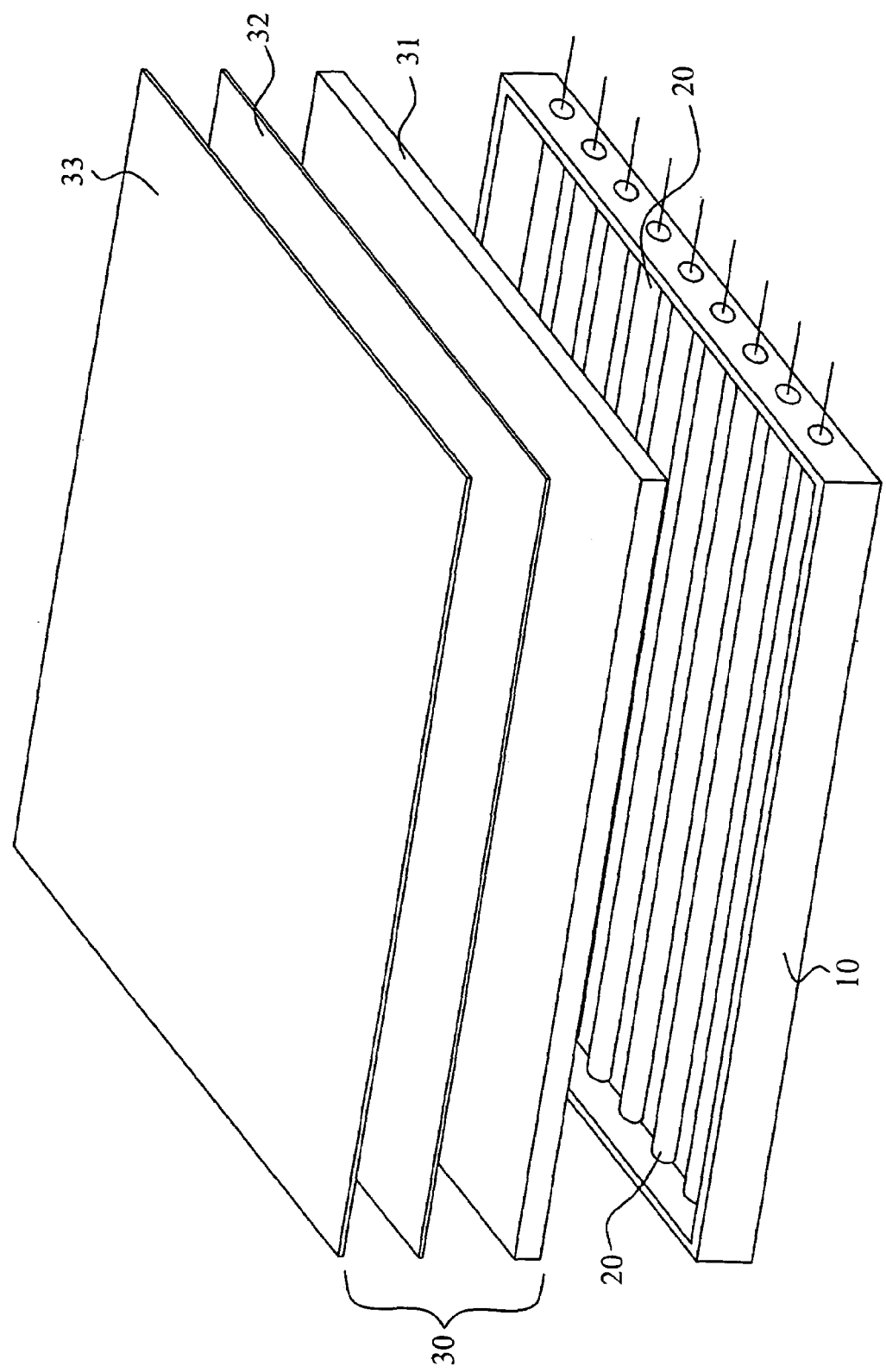
FIG. 1 is an exploded view of an orthogonal array backlight module of the prior art.
Figure 2:
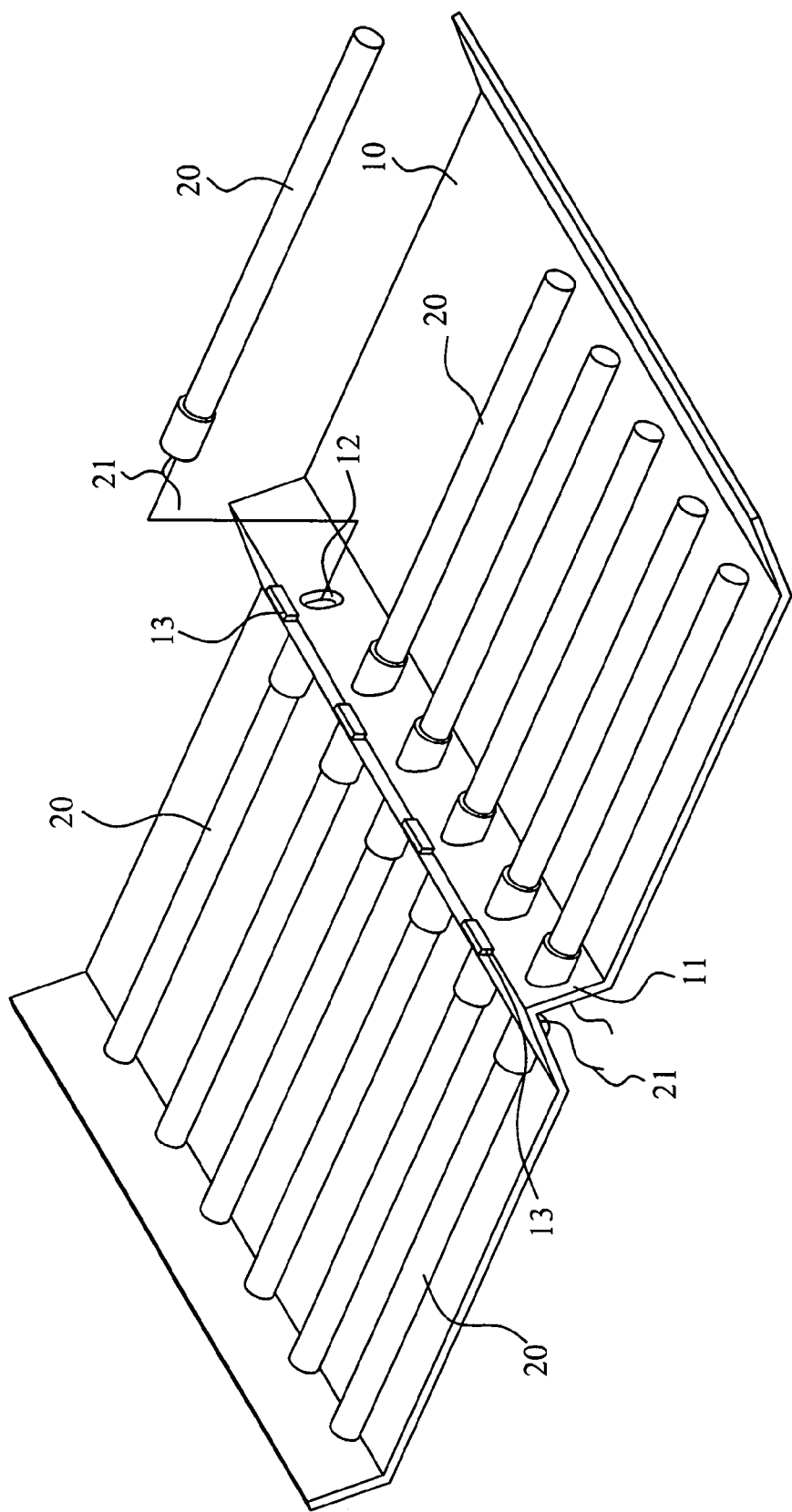
FIG. 2 is an exploded view of a structure for multiple fluorescent tubes in a first preferred embodiment of the present invention.
Figure 3:
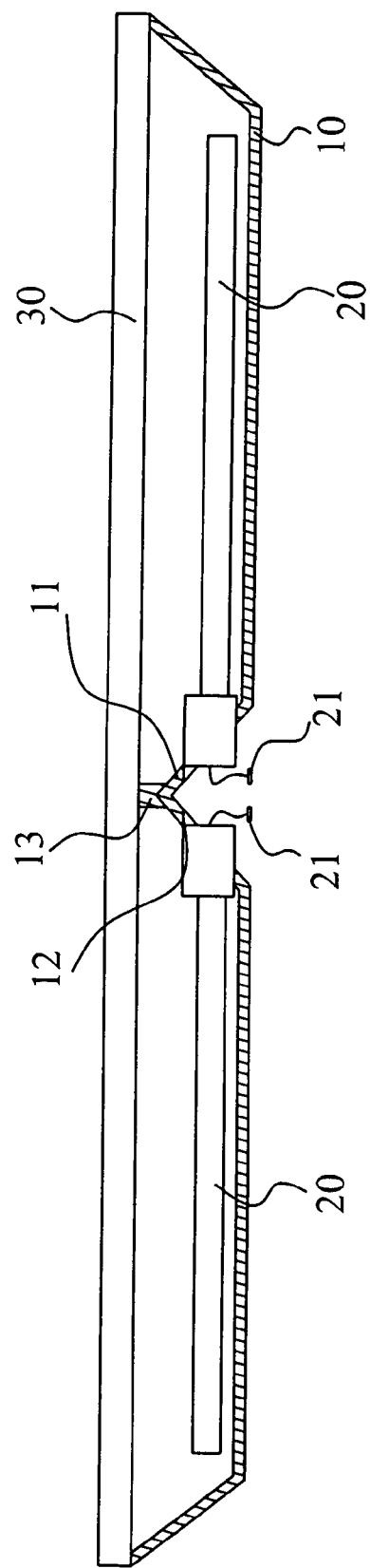
FIG. 3 is a sectional view of a structure for multiple fluorescent tubes in the first preferred embodiment of the present invention.

Referring to FIGS. 2 and 3, a preferred embodiment of the present invention is essentially comprised of an orthogonal array backlight module including multiple fluorescent tubes provided inside a light box and a display panel combined with a diffuser plate, an optical film, and a liquid crystal panel. Wherein, those fluorescent tubes 20 are paved of equal quantity on both wings in the light box 10. Given with the same size of the backlight module as that of the prior art, each fluorescent tube 20 is significantly shorter to permit easier assembly and to effectively avoid the flaw of being vulnerable to inconsistent distribution of luminance as observed with the prior art in the case longer fluorescent tubes are installed.

A saddle 11 is provided at the central line on the base of the light box 10 to define both wings in equal width. One end of each fluorescent tube 20 is fixed to a slope of the saddle 11 to serve as the adaptation end of an electrode 21 of the tube 20. Accordingly, all the electrode circuits from those multiple tubes 20 are collectively located at the middle section of the light box 10 to facilitate of the assembly of those multiple tubes 20 and the light source is more efficiently utilized when the saddle 11 further reflects the light emitted from each tube 20.

Figure 4:
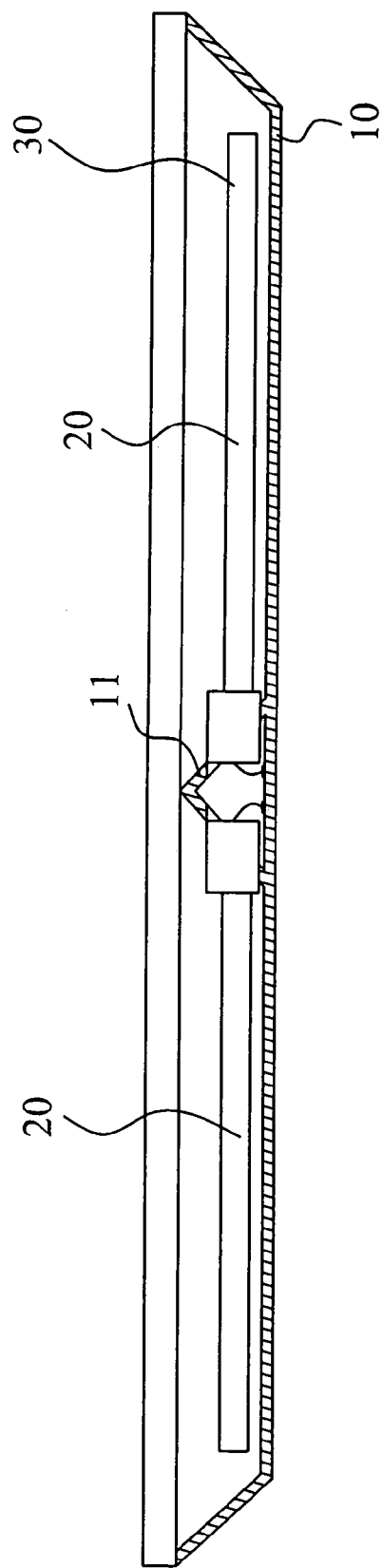
FIG. 4 is a sectional view of a structure for multiple fluorescent tubes in a second first preferred embodiment of the present invention.
Figure 5:
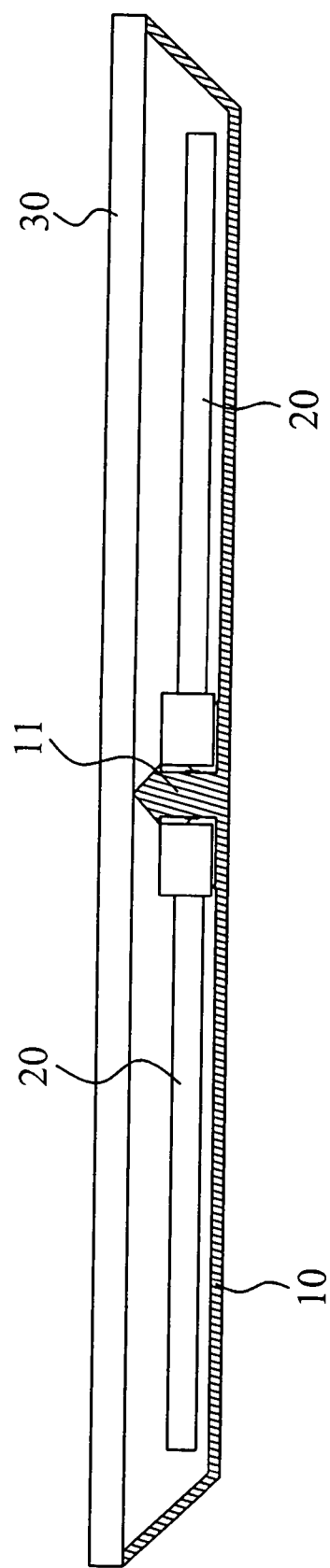
FIG. 5 is a sectional view of a structure for multiple fluorescent tubes in a third first preferred embodiment of the present invention.
Figure 6:
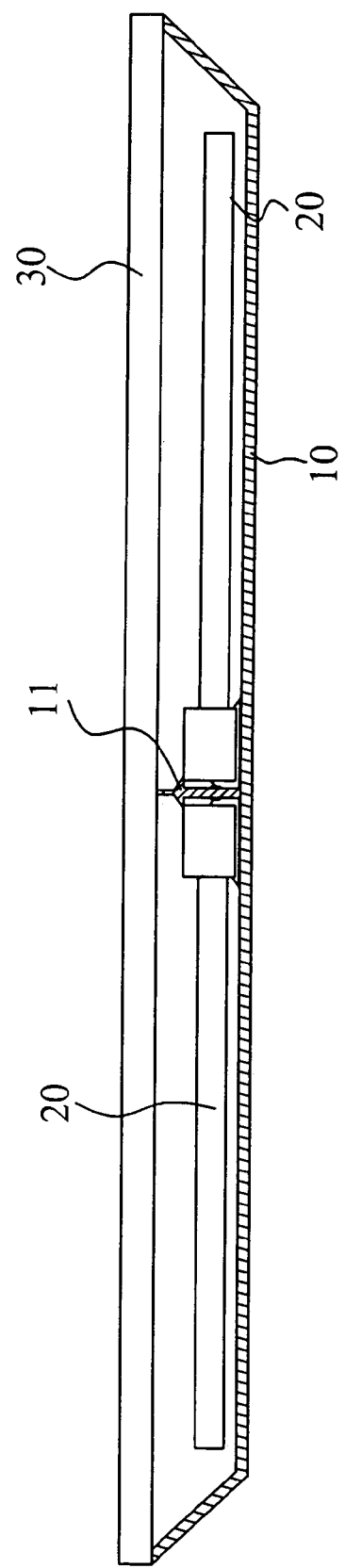
FIG. 6 is a sectional view of a structure for multiple fluorescent tubes in a fourth preferred embodiment of the present invention.

In the preferred embodiment illustrated in FIGS. 2 and 3, the saddle 11 is formed with the middle section of the base plate of the light box 10 folded into a triangle shape with two slopes. Each slope is drilled with multiple holes at same spacing, and each hole is inserted and fixed with a silica gel sleeve 12. Alternatively, the saddle 11 may be made integrated with the base plate of the light box 10 as illustrated in FIGS. 4 and 5, or separately made and attached to the base plate of the light box 10 as illustrated in FIG. 6.

Figure 7:
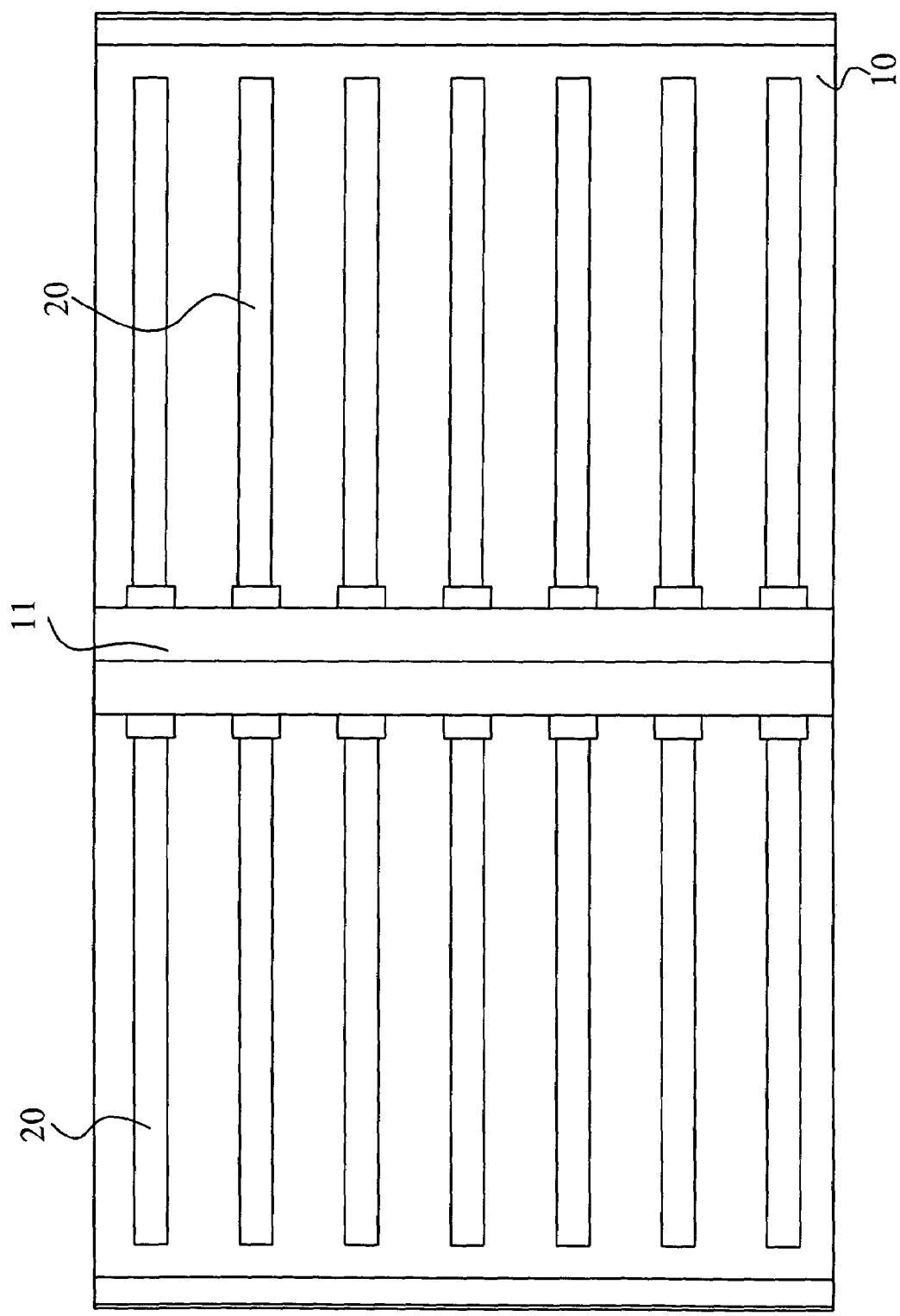
FIG. 7 is a schematic view showing a layout of the structure of multiple fluorescent tubes in the first preferred embodiment of the present invention.
Figure 8:
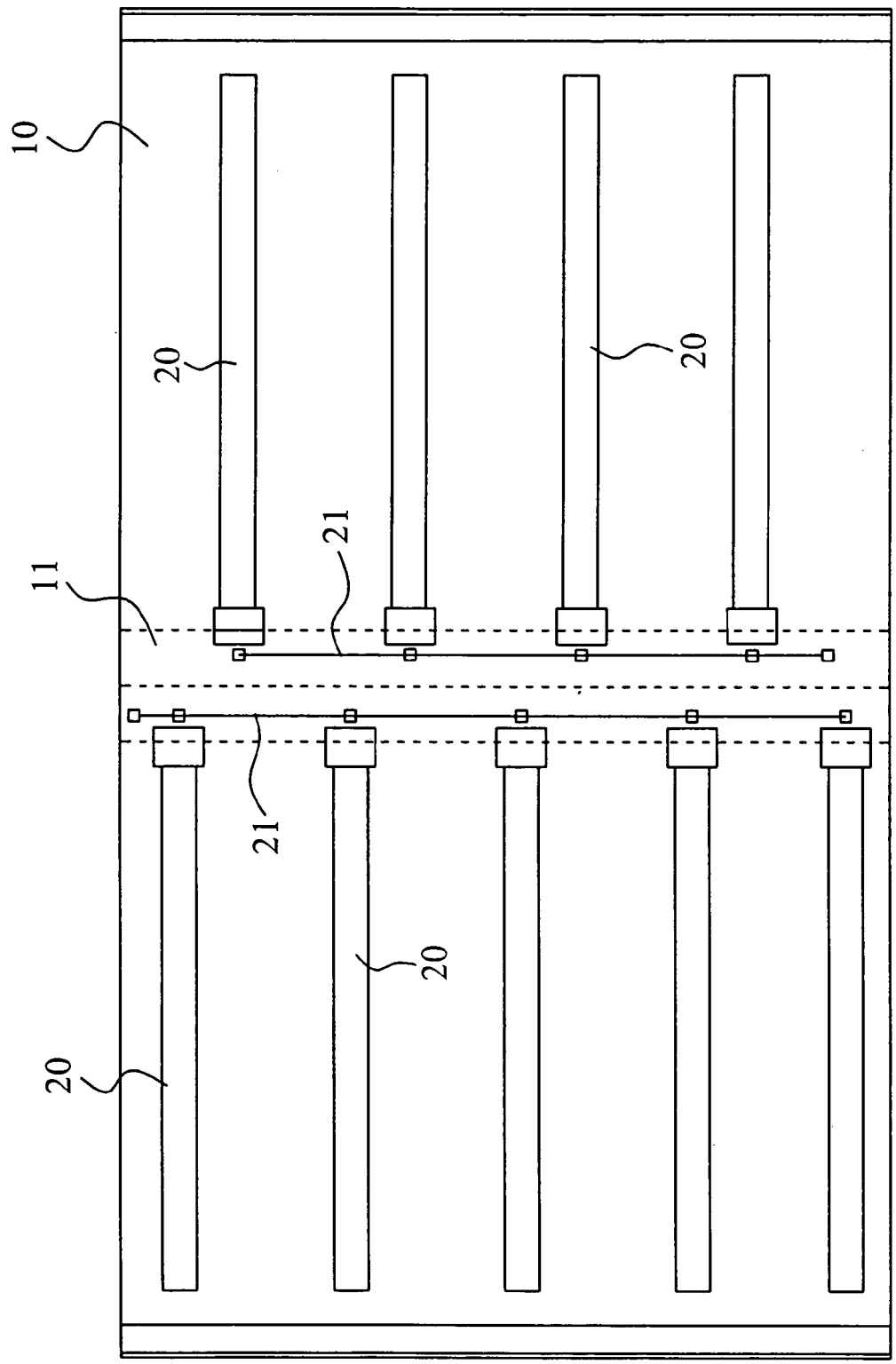
FIG. 8 is a schematic view showing a layout of the structure of multiple fluorescent tubes in the second preferred embodiment of the present invention.
Figure 9:
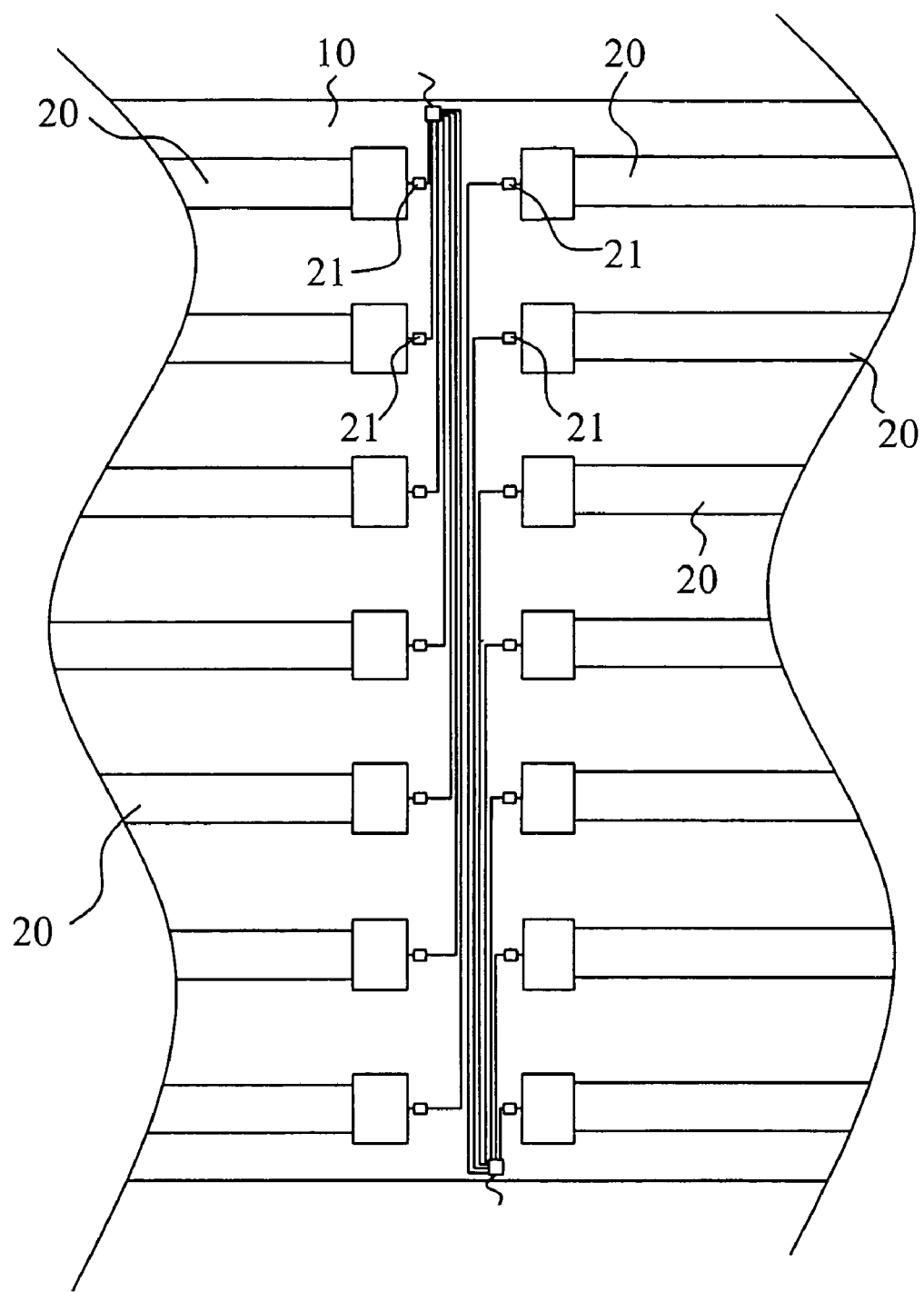
FIG. 9 is a schematic view showing a layout of the structure of multiple fluorescent tubes in the third preferred embodiment of the present invention.

Those multiple fluorescent tubes 20 on both wings in the light box 10 can be arranged in symmetric as illustrated in FIG. 7 or alternatively as illustrated in FIG. 8. All the electrodes of those fluorescent tubes installed on both wings in the light box 10 may be connected in series as illustrated in FIG. 8 or in parallel as illustrated in FIG. 9 as required.

Furthermore, as illustrated in FIG. 3, all the fluorescent tubes 20 are preferred to be installed as close to the bottom of the saddle 11 as possible to properly extend the distance between the light source and the display panel 30 for achieving a better light projection results. Alternatively, multiple protruding bits 13 are provided on ridge of the saddle to support the display panel 30 and prevent it from sagging.

The present invention provides an improved structure of arrangement of multiple fluorescent tubes for the orthogonal array backlight module. Therefore, the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A structure of fluorescent tubes in an orthogonal array backlight module comprised of a light box of the backlight module containing multiple fluorescent tubes, and a display panel covering up the top of the light box; a saddle with two slopes being provided at the central on the base plate of the light box to define two wings of the base plate of the light box; and multiple fluorescent tubes being equally provided on both wings with one end of each fluorescent tube fixed to the slope of the saddle, wherein each slope of the saddle is provided with multiple holes at same spacing, and each hole is inserted with a silica gel sleeve for the insertion of one end of each fluorescent tube.

2. A structure of fluorescent tubes in an orthogonal array backlight module comprised of a light box of the backlight module containing multiple fluorescent tubes, and a display panel covering up the top of the light box; a saddle with two slopes being provided at the central on the base plate of the light box to define two wings of the base plate of the light box; and multiple fluorescent tubes being equally provided on both wings with one end of each fluorescent tube fixed to the slope of the saddle, wherein multiple protruding bits to contact the display panel are provided on the ridge of the saddle.

* * * * *